United States Patent [19]
Yamano et al.

[11] Patent Number: 5,543,885
[45] Date of Patent: Aug. 6, 1996

[54] CAMERA SYSTEM

[75] Inventors: Shozo Yamano, Tokyo; Hidehiro Ogawa, Funabashi, both of Japan

[73] Assignee: Nikon Corporation, Tokyo, Japan

[21] Appl. No.: 266,666

[22] Filed: Jun. 28, 1994

Related U.S. Application Data

[63] Continuation of Ser. No. 105,188, Aug. 12, 1993, abandoned.

[30] Foreign Application Priority Data

Aug. 19, 1992 [JP] Japan .................................. 4-220267
Aug. 25, 1992 [JP] Japan .................................. 4-226124

[51] Int. Cl.⁶ .................................................. G03B 13/36
[52] U.S. Cl. .......................... 354/400; 354/412; 354/468
[58] Field of Search .................................. 354/412, 400, 354/402, 266, 268

[56] References Cited

U.S. PATENT DOCUMENTS 4,853,733  8/1989  Watanabe et al. .................. 354/412

*Primary Examiner*—W. B. Perkey
*Attorney, Agent, or Firm*—Staas & Halsey

[57] ABSTRACT

A camera system includes a camera body and an external device which supplies a control instruction for changing a predetermined function of the camera body to the camera body. It is determined in the camera body whether the control instruction is received. When it determined that no control instruction is received, a first function initially set in the camera body is rendered active. When it is determined that the control instruction is received, a second function is rendered active bored on a control instruction.

10 Claims, 8 Drawing Sheets

FIG. 8D

```
C3 SPORT
  PHOTOMETRY MODE         SPOT
  EXPOSURE MODE           M
  SYNCHRO MODE            REAR
  FILM FEEDING MODE       CH
 [CAMERA SHAKE ALARM]     OFF
  IN-FOCUS BEEP           ON
```

FIG. 8E

```
C3 SPORT
  AUTO U-TURN             YES
  LOCK BOTH AE & AF       YES
  STORE PHOTPGRAPHING DATA  NO
  WRITE ZERO FRAME DATA   YES
  TITLE
```

FIG. 8F

```
C3
CAMERA SHAKE ALARM

[ON]  OFF
```

FIG. 8G

```
C3
INPUT TITLE

<_            >
```

CAMERA SYSTEM

This is a continuation of application Ser. No. 08/105,188 filed Aug. 12, 1993, now abandoned.

BACKGROUND OF THE INVENTION

1. Field of the Invention

The present invention relates to a camera system including a camera capable of changing operational conditions by receiving externally supplied instructions or information.

2. Related Background Art

Conventionally, functions of a camera body are classified into normally active functions and functions that are rendered effective only when they are selected by selecting members of the camera body. For example, some cameras with an AF function have an AF priority mode, in which a shutter release operation is impossible unless a focus detection output indicates an in-focus state, and a release priority mode, in which a shutter release operation is possible regardless of the focus detection result. Users perform switching between these modes by manipulating a manipulating member arranged on a camera body.

If, however, a user wants to switch a mode once set to the other, he or she must manipulate the manipulating member on the camera body again. However, it may not be easy to directly manipulate the manipulating member of the camera body when the camera is set in a very narrow space or when the surrounding environment of the camera is not a normal one, it is practically impossible to change the functions of the camera, resulting in inconvenience in photography.

In order to set several operational conditions (e.g., photometry mode/exposure mode/synchro mode) of conventional cameras, users first select each individual item from several items and then set a certain one of functions (e.g., multipattern photometry/center priority photometry, program auto exposure/aperture priority auto exposure, and normal/slow synchro) of the selected item.

To set functions required for photography by using such conventional cameras, therefore, users must perform a cumbersome manipulation of selecting each individual item first and then setting each necessary function. In addition, even if data of all set items suitable for photography of a certain object to be photographed is stored as one group, some items in that group must be reset in photographing another object to be photographed.

SUMMARY OF THE INVENTION

It is an object of the first aspect of the present invention to provide a camera whose functions can be changed even when a camera body cannot be manipulated directly.

A camera system according to the first aspect of the present invention comprises a camera body capable of receiving a control instruction for changing a predetermined function thereof through serial communication. The camera body includes determining means for determining whether the control instruction is received, and executing means for rendering a first function initially set in the camera body active when the determining means determines that no control instruction is received, and rendering a second function based on a control instruction active when the determining means determines that the control instruction is received.

It is an object of the second aspect of the present invention to provide a camera system which frees users from a cumbersome manipulation of setting the individual items of several operational conditions of a camera.

In the camera system according to the second aspect of the present invention, an external memory which stores a plurality of series of information for designations of operational conditions of a camera transfers one series of information to the camera. This makes it possible to designate several operational conditions of the camera at one time.

BRIEF DESCRIPTION OF THE DRAWINGS

FIGS. 8A to 8G are views showing practical examples of the contents displayed on the screen of the external memory means (such as a personal computer) shown in FIG. 7.

DETAILED DESCRIPTION OF THE PREFERRED EMBODIMENTS

Figure 1:
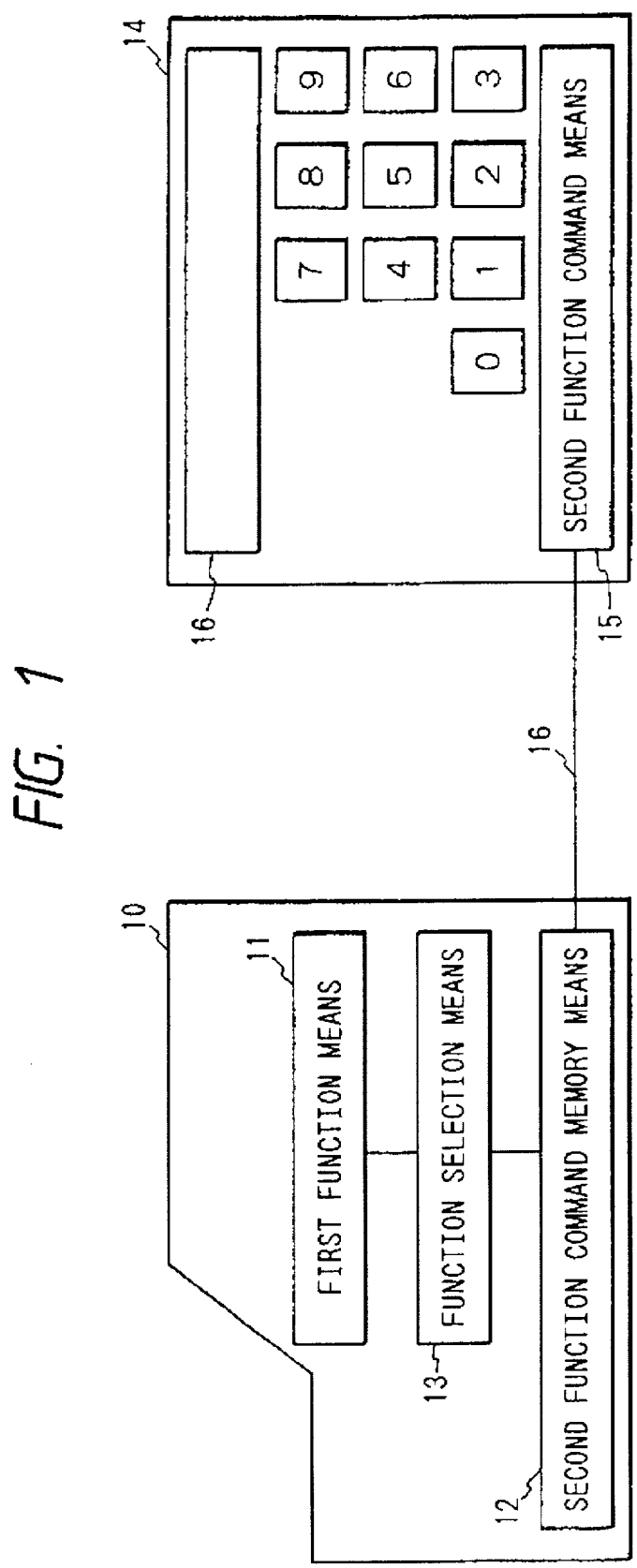
FIG. 1 is a schematic view showing the arrangement of one embodiment of the present invention.

FIG. 1 is a schematic view showing the arrangement of one embodiment of the present invention. A camera body 10 includes a first function means 11 which is normally active, a second function command memory means 12 which is commanded from outside the camera, and a function selection means 13 for selecting functions from the first and second functions. An external setting means 14, such as an electronic organizer, includes a second function command means 15. A command for a given function from the external setting means is communicated to the camera body through a serial line 16 and stored in the second function command memory means 12, such as a memory of a microcomputer. The external setting means 14 may also include a display 16, such as an LCD.

Table 1 below shows a comparison between the normally active first function and the second function which is rendered active by the external setting means.

TABLE 1

| Item | 1st function | 2nd function | |
|---|---|---|---|
| AF mode SW ON | AF priority | Release priority | Flag0 |
| AF mode SW OFF | Release priority | AF priority | Flag1 |
| AF activation | Half-push SW | AF lock SW | Flag2 |
| Unlock in AF-S | Unlock in release | No unlock in release | Flag3 |

Received data stored in a predetermined RAM of the internal microcomputer of the camera body by the serial communication corresponds to a predetermined flag (FLAG0 to FLAG3) of the second function command memory means. When the bit of this received data is "1" the second function is selected.

Figure 2:
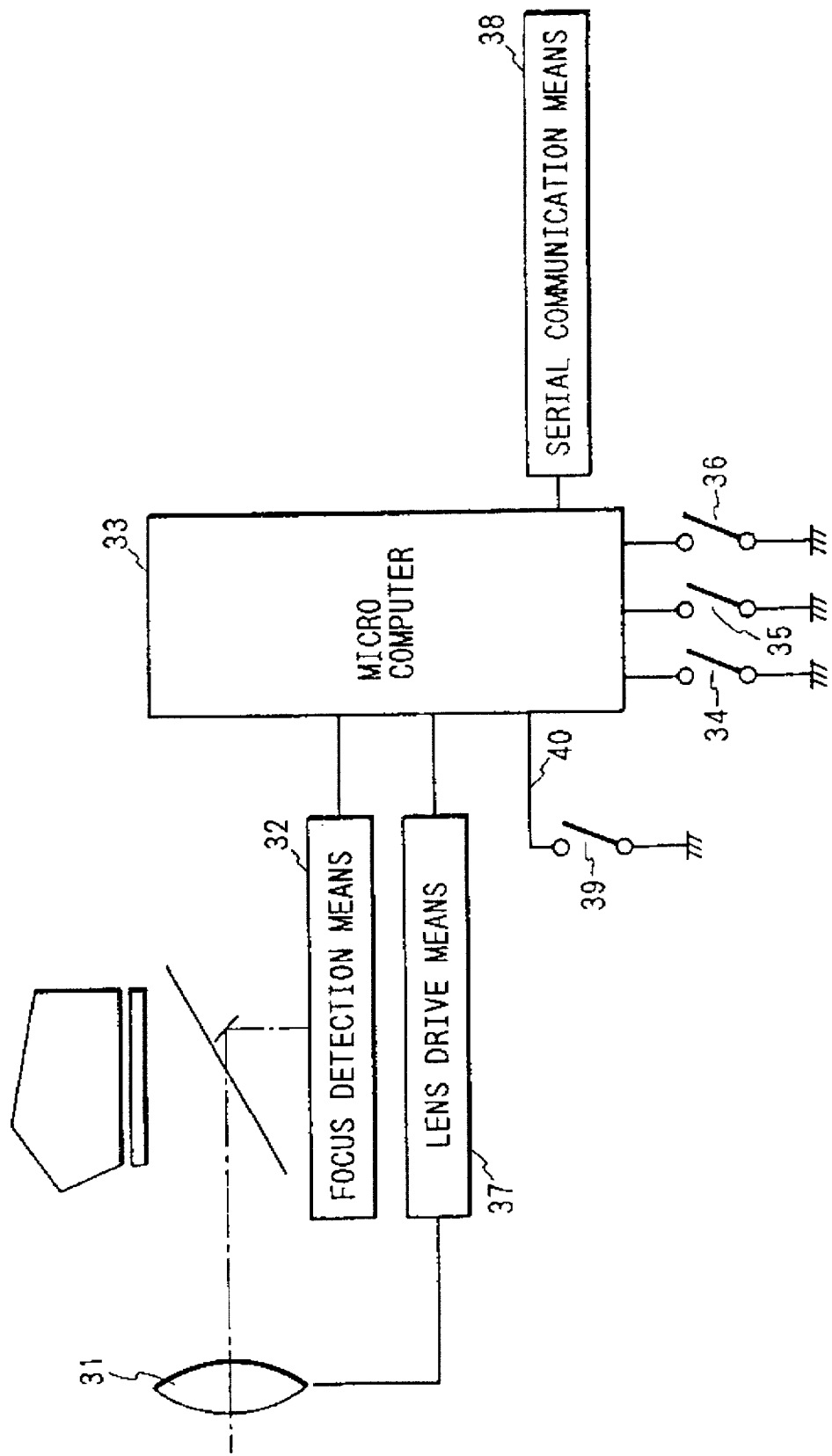
FIG. 2 is a block diagram showing a camera body incorporating the present invention.

FIG. 2 is a block diagram showing a camera body incorporating the present invention. Upon receiving light from an object to be photographed passing through a photographing lens 31, a focus detection means 32 detects the focus state of the object. A microcomputer 33 controls the focus detection means 32 and also controls a lens drive means 37 to execute AF in accordance with the output from the focus detection means 32 and with the conditions of an AF mode switch 34, a half-push switch 35, and a focus lock switch 36. The microcomputer 33 is connected to a serial communication means 38 capable of performing serial communication with the external second function command means. In addition, a release switch 39 is connected to an external interrupt terminal 40 of the microcomputer 33.

Figures 3, 3A:
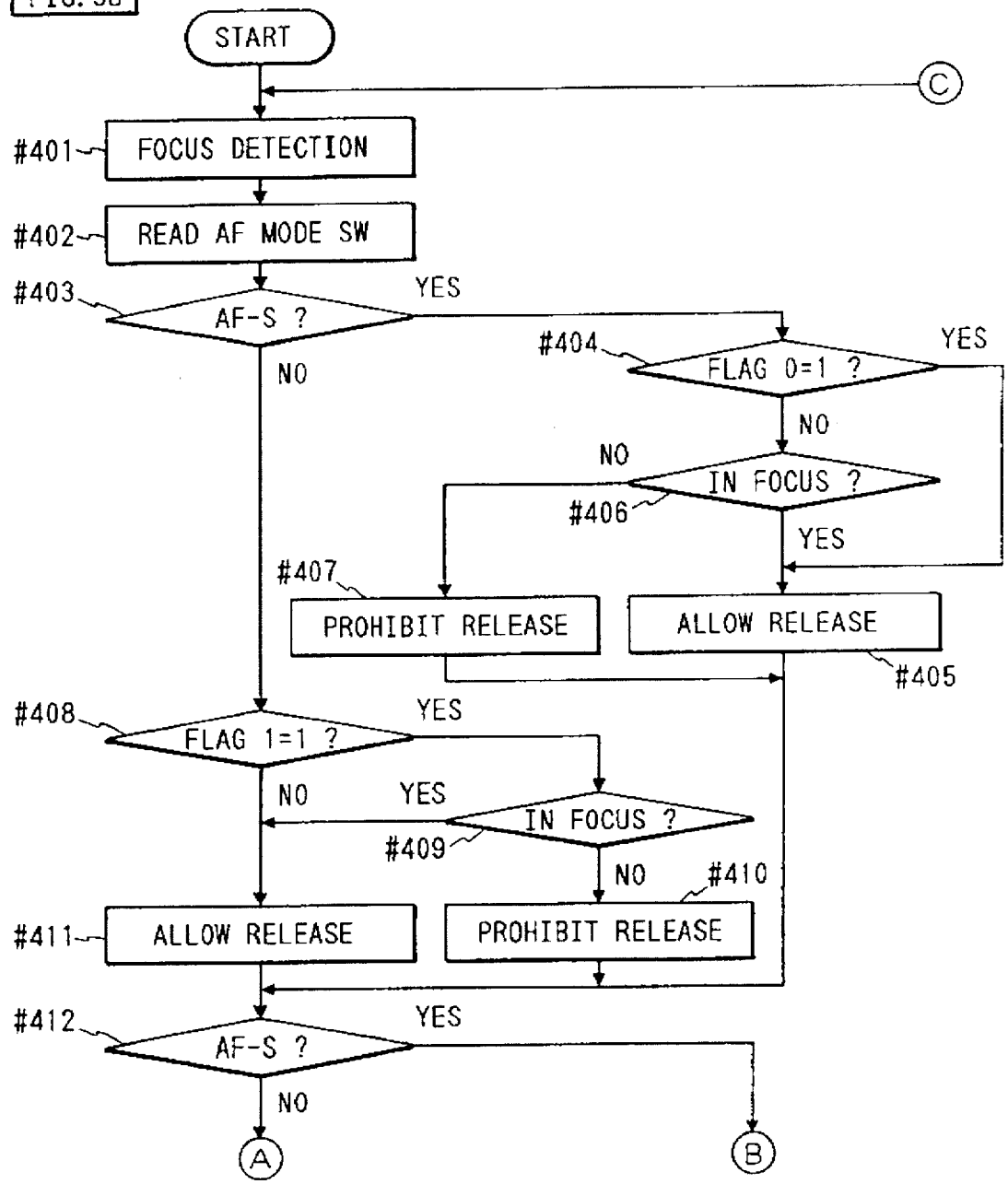
FIG. 3 is comprised of FIG. 3A and FIG. 3B showing flow charts showing the control flow of a microcomputer 33 for explaining the operation of the present invention.
Figure 3B:
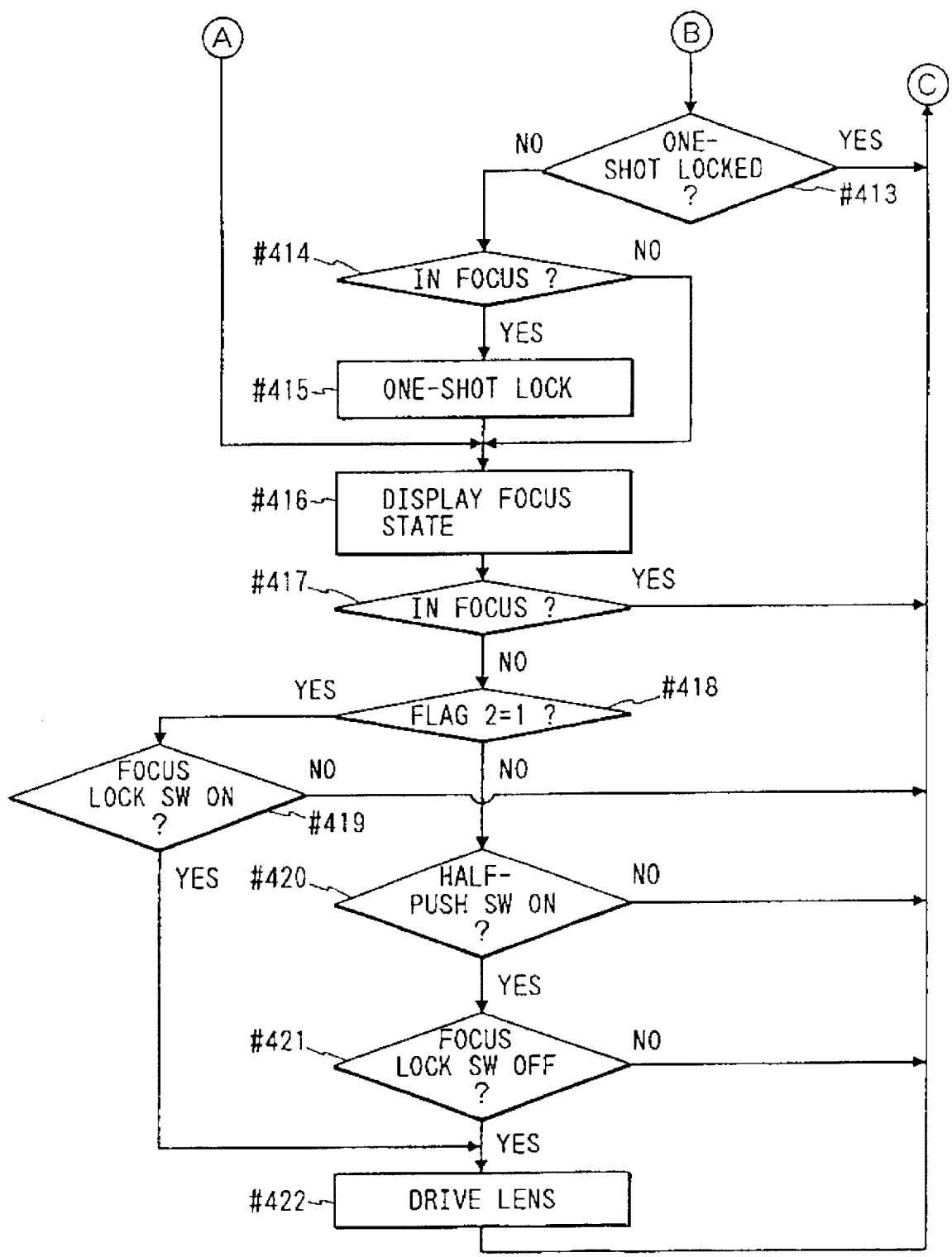

FIGS. 3A and 3B shows the control flow of the microcomputer 33 for explaining the operation of the present invention. When the focus detection means 32 executes focus detection (step #401), the microcomputer 33 reads the AF mode switch 34 (step #402). If the AF mode switch 34 is ON, this indicates that a so-called one-shot AF (AF-S) mode, in which AF lock is performed once an in-focus state is obtained, is set. In this case, the AF priority AF mode is set as shown in the column of the first function in Table 1 above. If the AF mode switch 34 is OFF, this means that a so-called continuous AF (AF-C) mode, in which AF is normally performed, is set. In this case, the release priority AF mode is set as shown in the column of the first function in Table 1. In step #403, the microcomputer 33 checks whether this AF-S is set. If AF-S is set in step #403, the microcomputer 33 checks in step #404 whether FLAG0 is set. This FLAG0 indicates external communication data stored in the internal memory of the microcomputer. If FLAG0 is "1," this means that release priority is set by the external command means. Therefore, the microcomputer 33 allows release (step #405) without performing in-focus/out-of-focus determination regardless of AF-S, and the flow advances to step #412. If FLAG0 is "0," this means that AF priority which is the original first function of the camera is set. Therefore, the microcomputer 33 checks in step #406 whether an in-focus state is obtained. If an in-focus state is obtained in step #406, the microcomputer 33 allows release (step #405); if an in-focus state is not obtained in step #406, the microcomputer 33 prohibits release in step #407, and the flow advances to step #412.

If the microcomputer 33 determines in step #403 that AF-S is not set, this indicates that continuous AF is set. In this case, the microcomputer 33 checks FLAG1 (step #408). If FLAG1 is "1," this means that AF priority is set by the external command means. Therefore, in-focus/out-of-focus determination is required regardless of AF-C, so the microcomputer 33 executes this determination in step #409. If an in-focus state is not obtained in step #409, the microcomputer 33 prohibits release (step #410). If FLAG1 is "0," this means that no function change is required by the external command means and release priority which the camera body originally has is set. Therefore, the microcomputer 33 allows release in step #411, and the flow advances to step #412.

In step #412, the microcomputer 33 checks whether the AF-S mode is set. If AF-S is not set in step #412, the flow immediately advances to display of a focus state (step #416). If AF-S is set in step #412, the microcomputer 33 checks whether one-shot lock is achieved (step #413). If the one-shot lock is already achieved in step #413, the flow advances to step #401 without executing display of a focus state and lens driving. If the one-shot lock is not achieved in step #413, the microcomputer 33 checks whether an in-focus state is obtained (step #414). If an in-focus state is obtained in step #414, the microcomputer 33 executes the one-shot lock (step #415).

In step #416, the microcomputer 33 displays a focus state on the basis of the focus detection result, and the flow advances to a routine for lens driving.

In step #417, the microcomputer 33 again performs the in-focus determination. If an in-focus state is obtained in step #417, the flow advances to step #401 without driving a lens. If an in-focus state is not obtained in step #417, the microcomputer 33 checks in step #418 whether FLAG2 is "1." If FLAG2 is "1," this indicates that AF activation is not the half-push switch 35 but the second function command instructs control by the focus lock switch 36 for lens driving, so the microcomputer 33 checks whether the focus lock switch 36 is ON (step #419). If the focus lock switch 36 is ON, the microcomputer 33 drives the lens and again executes the focus detection routine (step #401). If the focus-lock switch 36 is OFF, the flow advances to the focus detection routine (step #401) without performing lens driving. If FLAG2 is "0" in step #418, this means that lens driving corresponds to the manipulation of the half-push switch which is one of the original functions of the camera body, so the microcomputer 33 checks whether the half-push switch is ON (step #420). If the half-push switch is OFF, the flow advances to step #401 without driving the lens. If the half-push switch is ON, the microcomputer 33 executes lens driving if focus lock is not set by the lock switch 36. If focus the focus lock switch 36 is on, the flow advances to step #401 without executing lens driving.

Figure 4:
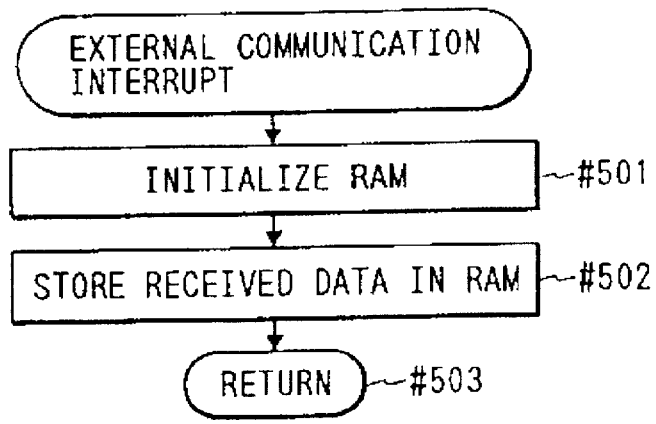
FIG. 4 is a flow chart showing an external communication interrupt flow.

FIG. 4 shows an external communication interrupt flow. In FIG. 4, the RAM is initialized (step #501) by communication interrupt, received data is stored in a predetermined area of the RAM (step #502), and then the flow returns to the main flow.

Figure 5:
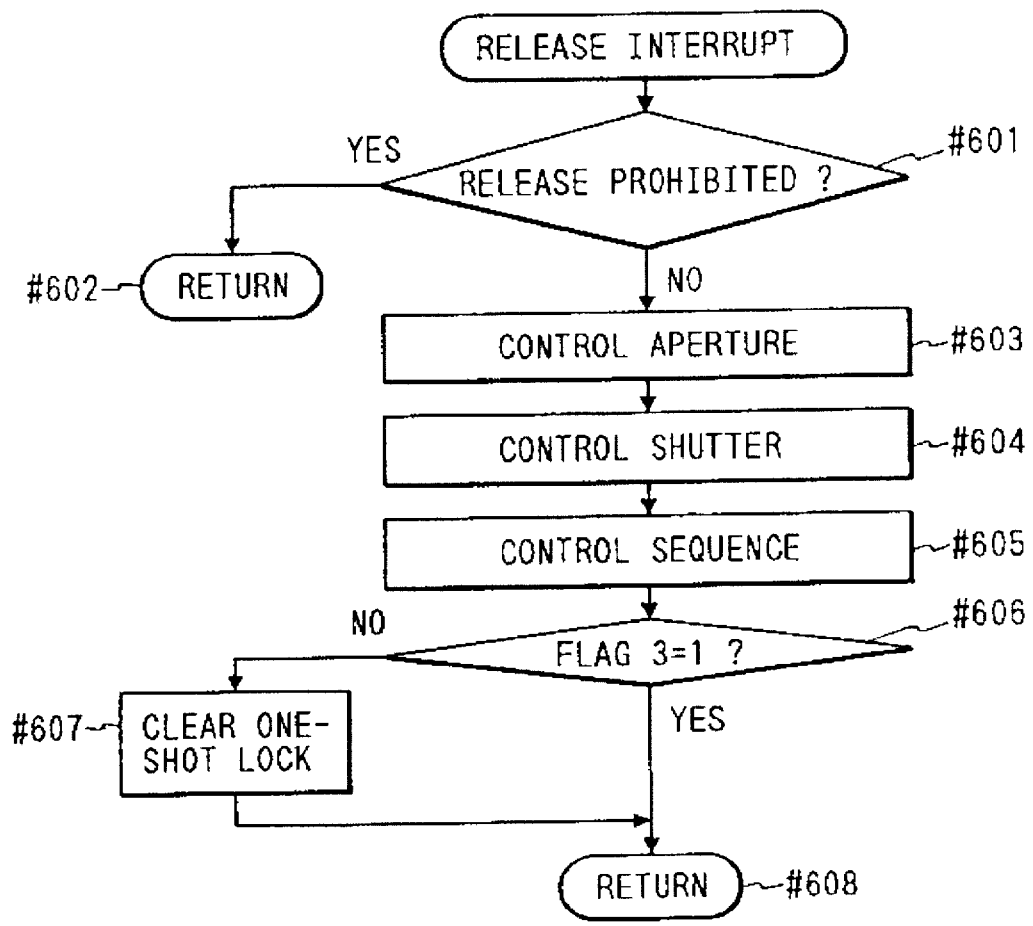
FIG. 5 is a flow chart showing a release interrupt routine.

FIG. 5 shows a release interrupt routine. The release interrupt is activated by ON of the release switch connected to the interrupt terminal of the microcomputer 33.

In the release interrupt routine, the microcomputer 33 first checks whether release is prohibited (step #601). If release is prohibited in step #601, the microcomputer 33 returns the flow without executing any processing (step #602). If release is allowed in step #601, the microcomputer 33 executes aperture control (step #603), shutter control (step #604), sequence control (step #605) such as feeding and shutter charge, and checks FLAG3 (step #606). If FLAG3 is "1," the microcomputer 33 does not clear the one-shot lock; if FLAG3 is "0," the microcomputer 33 clears the one-shot lock (step #607). Therefore, AF is executed as the original function of the camera whenever release is performed. When the second function is externally commanded, one-shot lock is maintained even if release is performed. This is convenient in the case of an operation not requiring AF each time release is performed.

In this embodiment, communication between the camera body and the external setting means (e.g., an electronic organizer) has been mentioned earlier, and operation examples that can be performed by the communication and possible examples of functions of the electronic organizer will be described below.

I. On-line mode (when the camera body is connected to the electronic organizer/IC card)

(1) Camera operation

Settings of various functions (e.g., photometry and exposure modes, an aperture value, and a shutter speed) of the camera, display of the camera condition, and shutter release can be controlled from the electronic organizer.

(2) Custom setting (i) Setting of custom reset: when a reset operation is performed in the camera body, various conditions are reset to initial conditions set by a user. Functions whose initial conditions can be set are a photometry mode, an exposure mode, a film feeding mode, a synchro mode, and a focus area.

(ii) Custom setting: the following functions can be set in accordance with the taste of a user. Cancellation of only a camera shake alarm, cancellation of only an in-focus beep, DX priority of a film speed, lock of both AE and AF, auto U-turn at the end of a film, change of time of a half-push timer, focus priority in continuous AF servo, release priority in single AF servo, continuous photography by single AF servo, stop of AF driving after the second frame, AF lens driving by an AF lock button manipulation, change from display of an image program mode for selecting an optimal aperture value and an optimal shutter speed from actual photographing data of each genre a custom program mode in which desired exposure can be preset by the electronic organizer to display of the number of exposures of a film, switching between valve/time, synchronous/alternate/asynchronous of release modes when two cameras are interlocked, and writing of zero frame data.

(iii) Custom program: a desired program line can be programmed and transferred to the camera body.

(3) Photographing data

The following photographing data to be stored in the camera body are read and stored.

Shutter speed/aperture value/photometry mode/exposure mode/synchro mode/focal length of lens/exposure compensation amount/flash control compensation amount/ISO speed.

(4) Settings of special photography

Settings of special photography include AE bracketing (in which photography of a set number of frames is performed while the shutter speed and the aperture value are shifted step by step by preset compensation steps)/speed light bracketing (in which photography of a set number of frames is performed while the speed light quantity alone is shifted step by step by preset compensation steps without changing the background exposure)/multiple exposure function/flash control compensation/N-frame sequence (in which continuous photography of a set number of frames is possible while a shutter button is kept depressed in a film continuous winding mode)/focus priority (which can set a state in which release is possible constantly regardless of the focus state and a state in which shutter release is impossible unless an in-focus state is obtained).

II. Off-line mode (when the electronic organizer and the IC card alone are used)

(1) Electronic manual

An electronic manual explains a camera operating method in a simple-to-use manner.

(2) Handbooks of photography

Handbooks of photography include a book of photographic terms: in which photographic terms and camera terms are described, and a book of photographic formulas: in which formulas concerning photography are explained.

(3) Utility

Utility includes formation of files for on-line mode custom setting (custom reset, custom setting, and custom program), display of photographing data/title input/memo input/film erasure, and display of the number of files and the used amount of a memory.

When a control instruction is externally supplied by the serial communication, the camera system described above operates in accordance with the instructed function. Therefore, the functions can be changed even in situations where the camera body is not easy to directly manipulate, so this camera system is very effective as a multifunction camera.

Figure 6:
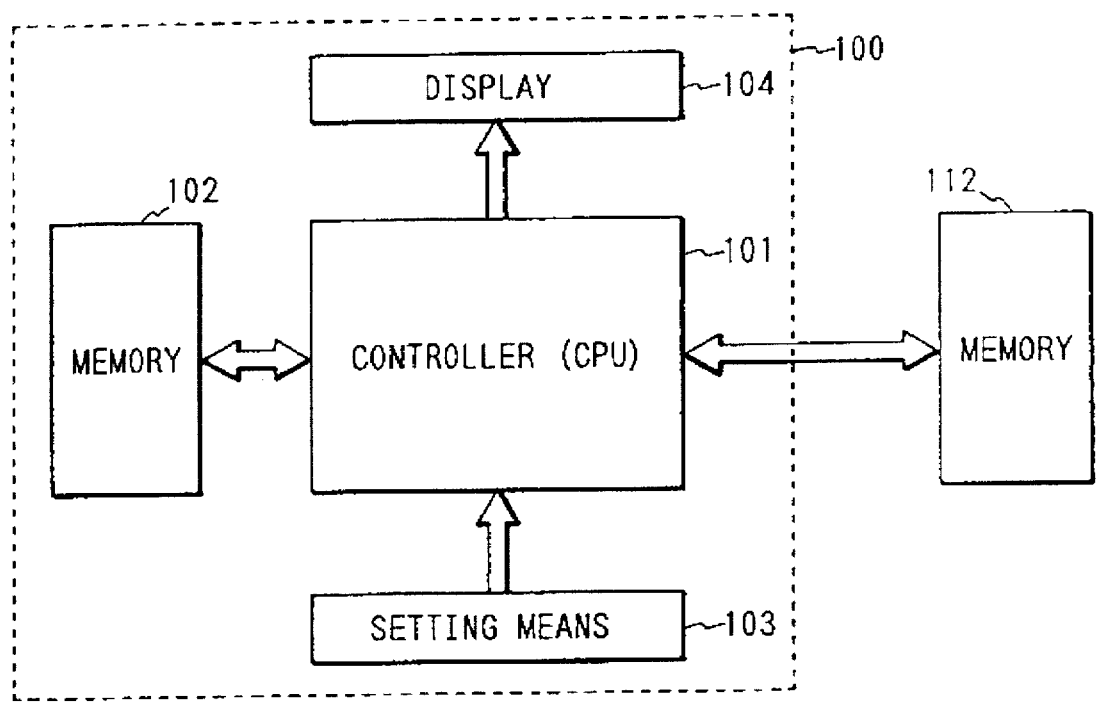
FIG. 6 is a block diagram showing a connection between a camera according to an embodiment of the second aspect of the present invention and an external memory means (such as an IC card)

FIG. 6 is a view showing a camera system according to the second aspect of the present invention.

Referring to FIG. 6, a portion surrounded by broken lines indicates a camera 100, and an internal memory 102 and a setting means 103 for setting various photographing conditions are connected to a controller (CPU) 101 of the camera 100. The conditions set by the setting means 103 are displayed on a display 104. In addition, a detachable external memory 112 (e.g., a card IC or a photomagnetic memory card) can be electrically connected to the CPU 101 of the camera.

Custom setting for setting the functions of the camera in accordance with the taste of a user can be performed for functions whose photographing conditions can be set by the setting means 103.

Table 2 shows a list of items of the photographing conditions of the camera and custom setting.

TABLE 2

| No. | Item | Choices | | |
|---|---|---|---|---|
| 1 | Photometry mode | Multi-pattern | Center priority | Spot |
| 2 | Exposure mode | P | A | S    M |
| 3 | Synchro mode | NORMAL | SLOW | REAR |
| 4 | Film feeding mode | One frame | Low-speed continuous | High-speed continuous |
| 5 | Camera shake alarm | | ON | OFF |
| 6 | In-focus beep | | ON | OFF |
| 7 | Auto U-turn | | YES | NO |
| 8 | Lock both AE & AF | | YES | NO |
| 9 | Store photographing data | | YES | NO |
| 10 | Write zero frame data | | YES | NO |

In Table 2, "photometry mode" (No. 1) can be selected from multipattern photometry, center priority photometry, and spot photometry. "Exposure mode" (No. 2) can be selected from P (program auto), A (aperture priority auto), S (shutter priority auto), and M (manual). "Synchro mode" (No. 3) can be selected from NORMAL (leading curtain synchro), SLOW (slow synchro), and REAR (rear synchro). "Film feeding mode" (No. 4) can be selected from one-frame winding, low-speed continuous winding, and high-speed continuous winding. "Camera shake alarm" (No. 5) can be selected from ON (alarm) and OFF (no alarm). "In-focus beep" (NO. 6) can be selected from ON (beep) and OFF (no beep) in accordance with whether a beep is sounded when an in-focus state is obtained. "Auto U-turn" (No. 7) can be selected from YES and NO in accordance with whether automatic rewind is performed at the end of a film. "Lock both AE & AF" (NO. 8) can be selected from YES and NO in accordance with whether other functions are locked on the basis of the AF lock conditions or by the AE locking manipulation. "Store photographing data" (No. 9) can be selected from YES and NO in accordance with whether photographing data such as a shutter speed and an aperture value in photography is stored. "Write zero frame data" (No. 10) can be selected from YES and NO in accordance with whether data is automatically written in the 0th frame upon easy loading of a film.

The functions of Nos. 1 to 4 can be set easily by the setting means 103 of the camera. The functions of Nos. 5 to 10, however, are normally set by custom setting; that is, these functions of the camera 100 are set in accordance with the taste of a user and hence cannot be set easily by using, e.g., the setting means 103.

The photographic modes indicated by Nos. 1 to 4 are set by the setting means 103 shown in FIG. 6, such as various buttons or dials. The set contents are displayed on the display 104 and at the same time stored in the internal memory 102. As for the custom setting, a camera by which a user performs custom setting by using special custom setting buttons and dials while monitoring a display is known as a camera in which settings can be performed by using only a camera body. In this method, however, only one combination can be set. In this embodiment, therefore, a plurality of groups of setting conditions are stored in the external memory 112 and transferred to the camera at once, thereby setting various functions at one time.

Table 3 shows examples of the contents stored in the external memory 112.

TABLE 3

| Item | Group 1 | Group 2 | Group 3 |
| --- | --- | --- | --- |
| Photometry mode | Multi pattern | Center priority | Spot |
| Exposure mode | P | S | M |
| Synchro mode | NORMAL | SLOW | REAR |
| Film feeding mode | S (one frame) | CL (low-speed continuous) | CH (high speed continuous) |
| Camera shake alarm | ON | ON | OFF |
| In-focus beep | ON | OFF | ON |
| Auto U-turn | YES | YES | YES |
| Lock both AE & AF | NO | NO | YES |
| Store photographing data | YES | YES | NO |
| Write zero frame data | YES | YES | YES |

Three types of information concerning the setting conditions of ten items from "photometry mode" to "write zero frame data," described above are stored for Groups 1 to 3. The external memory 112 can store such information of a plurality of groups, and the setting conditions of one of a plurality of groups are set in the camera as needed.

A practical method of achieving this will be described below.

Referring to FIG. 6, after the external memory 112 is mounted on the camera, one of the custom setting groups is selected by the setting means 103. Assume, for convenience in explanation, that the selected group is Group 3. In Group 3, the conditions suitable for photography of a certain object to be photographed are preset for individual items. If, however, a user prefers to change the photometry mode from "spot photometry" to "multipattern photometry" for an object that the user intends to photograph, he or she changes only the item of photometry mode by using the setting means 103 and stores the changed content in the external memory 112. To transfer the stored contents of Group 3 to the camera, the user need only perform a manipulation of selecting Group 3 from the memory 112 and setting Group 3 in the camera 100 by using the setting means 103. That is, when the controller 101 determines that the contents of Group 3 stored in the external memory 112 are selected by the manipulation of the setting means 103, the controller 101 reads out information of a necessary number of bytes from a specific address of the external memory 112 and writes the readout information in a predetermined address of the internal memory 102.

Figure 7:
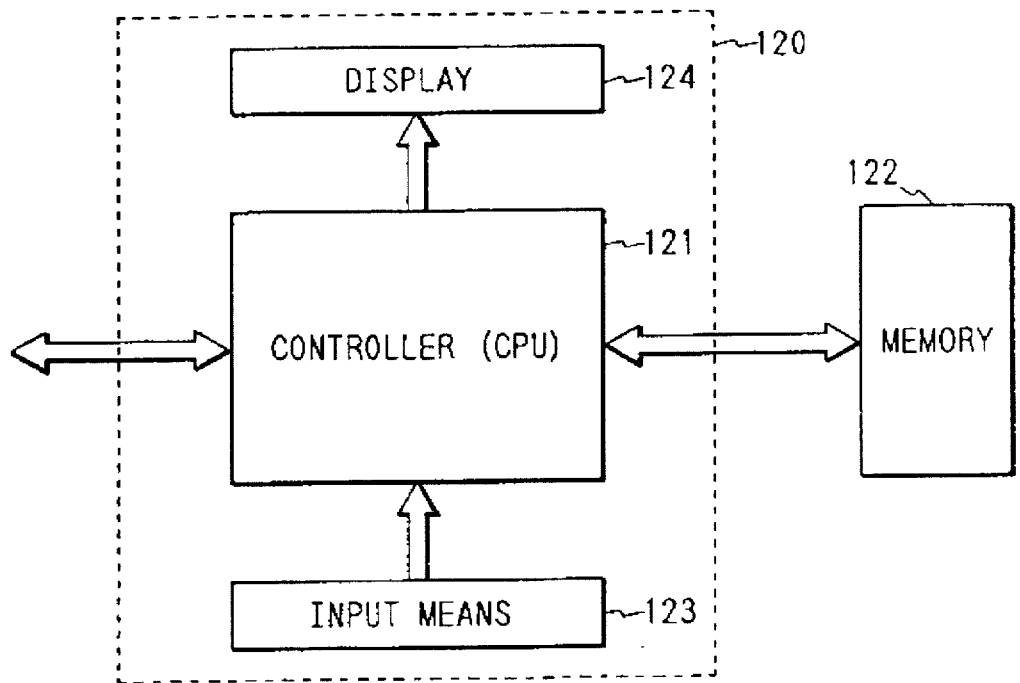
FIG. 7 is a block diagram showing a connection between a camera according to another embodiment of the present invention and an external memory means (such as a personal computer)

FIG. 7 shows another embodiment of an external memory 120, such as a personal computer or an electronic organizer, which includes a display 124, an input means 123, and a memory 122. Referring to FIG. 7, a controller (CPU) 121 is connected to a detachable memory, i.e., the memory 122 (e.g., a floppy disk or an IC card), the input means (keyboard) 123, and the display (e.g., an LCD). The device shown in FIG. 7 can communicate with the camera body shown in FIG. 6 through a communication cable (not shown).

FIGS. 8A to 8G show examples of the contents displayed on the screen of the display 124 of the external memory shown in FIG. 7.

Figure 8A:
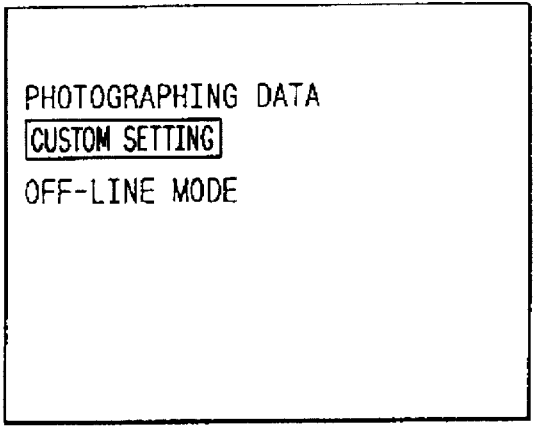

FIG. 8A shows an operation menu, in which "photographing data" is for reading out photographing data from the camera or displaying the readout photographing data; "custom setting" is a specific menu item of the embodiment of the present invention and will be described in detail later; and "off-line mode" is a menu item for displaying information related to the camera and photographs. When "custom setting" is selected from the menu shown in FIG. 8A, a custom setting menu shown in FIG. 8B is displayed.

Figure 8B:
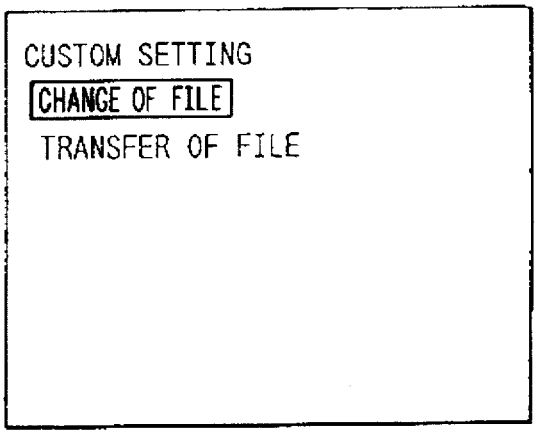
Figure 8C:
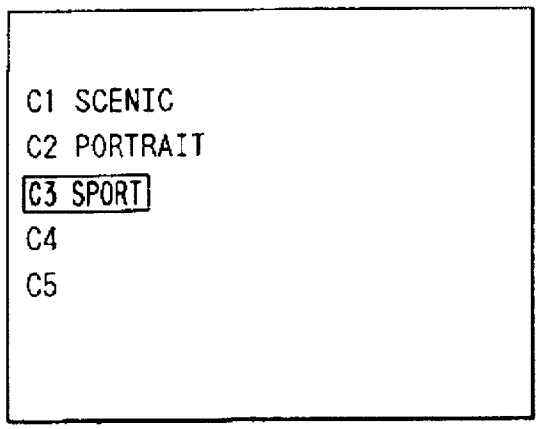

FIG. 8B illustrates two menu items "change of file" and "transfer of file." The memory 122 can store setting information of a plurality of groups. The "change of file" menu is a mode for changing the contents of a selected file. When "change of file" is selected from the menu shown in FIG. 8B, a display shown in FIG. 8C appears. FIG. 8C illustrates file names (C1 to C3) of individual groups and the titles of these files.

Referring to FIG. 8C, C1 and C3 are file names and present in the same number as that of groups. The characters "scenic," "portrait," and "sport" are the titles of the individual files, and arbitrary titles can be set. FIGS. 8D and 8E show the set contents displayed on the display screen, in which the set conditions of the file C3 are illustrated. These set conditions correspond to Group 3 in Table 3.

FIG. 8F shows an example of display for setting each individual item, in which an instruction for setting camera shake alarm is illustrated. FIG. 8G shows an instruction for inputting the title of a file displayed on the screen.

To check the contents (set contents of individual items) of a file, a user selects the file from the menu shown in FIG. 8C. As a result, the information shown in FIG. 8D is displayed. In FIG. 8D, not all items are displayed. To check other items, the user need only scroll the display by using cursor keys (not shown) of the input means. FIG. 8E illustrates the display after being scrolled. To change the set contents, the user selects the item from FIG. 8D or 8E, thereby switching the display to that shown in FIG. 8F. The user can perform setting by selecting On or Off by using the cursor keys and depressing the enter key when the information shown in FIG. 8F is displayed on the screen. To input a title to the file, the user need only select the item "title" from the menu shown in FIG. 8E, thereby switching the display to that shown in FIG. 8G. The user then inputs the title by inputting characters from the keyboard of the input means, as shown in FIG. 8G. The contents stored as "sport" are erased by replacing the title of C3 with this new title "silhouette." If the user does not want to erase the group "sport," he or she may create a new group, C4.

With the above manipulations, files of combinations of optimal settings for, e.g., sport photographs or scenic photographs are formed, and a user can easily confirm the contents of the files by inputting titles to these files.

A method of calling a custom setting file and setting it in the camera will be described. To set the custom setting file in the camera, a user connects the device shown in FIG. 7 to the camera through a cable (not shown) or the like. The user then selects "transfer of file" from the menu shown in FIG. 8B by manipulating the input means of the device shown in FIG. 7. Consequently, the information shown in FIG. 8C is displayed. The user therefore selects a file to be transferred by using the cursor keys and depresses an execute key (not shown). The file thus selected is transferred to the camera through communication and stored in the memory in the controller 101 shown in FIG. 6. As a result, various set items are set in the camera at one time in accordance with the taste of the user.

According to the camera system as has been described above, the operability of the camera is effectively improved because a plurality of operational conditions of the camera can be set at once.

What is claimed is:

1. A camera system, comprising:

an external unit for supplying a control instruction; and a camera body, operatively connectable to said external unit, including a focus detecting unit; and a processor, coupled to said focus detecting unit, for determining whether the control instruction is received from said external unit and for rendering a first function initially set in said camera body active when no control instruction is received, and rendering a second function active, based on the control instruction, when the control instruction is received, where the first function is an auto-focus priority mode in which release cannot be performed unless said focus detecting unit determines that an in-focus state is obtained, and the second function is a release priority mode in which release is possible regardless of a focus state.

2. A camera system, comprising:

an external unit for supplying a control instruction; and a camera body, operatively connectable to said external unit, including a focus detecting unit; and a processor, coupled to said focus detecting unit, for determining whether the control instruction is received from said external unit and for rendering a first function initially set in said camera body active when no control instruction is received, and rendering a second function active, based on the control instruction, when the control instruction is received, where the first function is a release priority mode in which release is possible regardless of a focus state, and the second function is an auto-focus priority mode in which release cannot be performed unless said focus detecting unit determines that an in-focus state is obtained.

3. A camera system, comprising:

a lens;

an external unit for supplying a control instruction; and a camera body, operatively connectable to said external unit, including a shutter release button;

a switch interlocked with said shutter release button;

a focus lock switch;

a focus detecting unit producing a focus detection result; and a processor, coupled to said focus detecting unit, for determining whether the control instruction is received from said external unit and for rendering a first function initially set in said camera body active when no control instruction is received, and rendering a second function active, based on the control instruction, when the control instruction is received, where the first function is a mode in which said lens is driven to obtain an in-focus state based on the focus detection result while said switch interlocked with said shutter release button is ON, and, when said focus lock switch is ON, an auto-focusing operation is prohibited even if said switch interlocked with said shutter release button is ON, and the second function is a mode in which said lens is or is not driven to obtain an in-focus state based on the focus detection result in accordance with whether said focus lock switch is ON, regardless of whether said switch interlocked with said shutter release button is ON.

4. A camera system, comprising:

an external unit for supplying a control instruction; and a camera body, operatively connectable to said external unit, including a focus unit; and a processor, coupled to said focus detecting unit, for determining whether the control instruction is received from said external unit and for rendering a first function initially set in said camera body active when no control instruction is received, and rendering a second function active, based on the control instruction, when the control instruction is received, where when said camera body is set in a one-shot auto-focus lock mode in which focus lock is performed once an in-focus state is obtained, the first function is a mode in which lock is canceled when release is performed, and the second function is a mode in which lock is maintained even after release is performed.

5. A camera body capable of receiving control instruction for changing a predetermined function thereof, comprising:

a focus detecting unit; and a processor for determining whether the control instruction is received and for rendering a first function initially set in said camera body active when no control instruction is received, and rendering a second function active, based on the control instruction, when the control instruction is received, where the first function is an auto-focus priority mode in which release cannot be performed unless said focus detecting unit determines that an in-focus state is obtained, and the second function is a release priority mode in which release is possible regardless of a focus state.

6. A camera body capable of receiving a control instruction for changing a predetermined function thereof, comprising:

a focus detecting unit; and a processor for determining whether the control instruction is received and for rendering a first function initially set in said camera body active when no control instruction is received, and rendering a second function active, based on the control instruction, when the control instruction is received, where the first function is a release priority mode in which release is possible regardless of a focus state, and the second function is an auto-focus priority mode in which release cannot be performed unless said focus detecting unit determines that an in-focus state is obtained.

7. A camera body for use with a lens and capable of receiving a control instruction for changing a predetermined function thereof, comprising:

a shutter release button;

a switch interlocked with said shutter release button;

a focus lock switch;

a focus detecting unit producing a focus detection result; and a processor for determining whether the control instruction is received and for rendering a first function initially set in said camera body active when no control instruction is received, and rendering a second function active, based on the control instruction, when the control instruction is received, where the first function is a mode in which said lens is driven to obtain an in-focus state based on the focus detection result while said switch interlocked with said shutter release button is ON, and, when said focus lock switch is ON, an auto-focusing operation is prohibited even if said switch interlocked with said shutter release button is ON, and the second function is a mode in which said lens is or is not driven to obtain an in-focus state based on the focus detection result in accordance with whether said focus lock switch is ON, regardless of whether said switch interlocked with said shutter release button is ON.

8. A camera body capable of receiving a control instruction for changing a predetermined function thereof, comprising:

a focus detecting unit; and a processor for determining whether the control instruction is received and for rendering a first function initially set in said camera body active when no control instruction is received, and rendering a second function active, based on the control instruction, when the control instruction is received, where when said camera body is set in a one-shot auto-focus lock mode in which focus lock is performed once an in-focus state is obtained, the first function is a mode in which lock is canceled when release is performed, and the second function is a mode in which lock is maintained even after release is performed.

9. A camera system, comprising:

a camera body including an internal memory for storing a series of information for designations of a plurality of operational conditions of said camera body; and an external unit, capable of communicating with said camera body, including an external memory for storing plurality of the series of information for designations of plurality of operational conditions of said camera body;

an input unit for changing the information stored in said external memory and for selecting one of the series of information to be stored in said internal memory means from the plurality of series of information stored in said external memory; and a control unit for controlling transfer of the one series of information selected by said selecting device from said external memory to said internal memory.

10. A camera system according to claim 9, wherein the information stored in said external memory can be input via said input unit, and wherein said external unit further comprises a display unit for displaying details of the plurality of the series of information stored in said external memory.

\* \* \* \* \*

UNITED STATES PATENT AND TRADEMARK OFFICE
CERTIFICATE OF CORRECTION

PATENT NO. : 5,543,885
DATED : August 6, 1996
INVENTOR(S) : Shozo YAMANO et al.

It is certified that error appears in the above-indentified patent and that said Letters Patent is hereby corrected as shown below:

Column 10, line 25, (claim 4) after "focus" insert --detecting--.

Signed and Sealed this

Seventh Day of January, 1997

Attest:

BRUCE LEHMAN

*Attesting Officer*   *Commissioner of Patents and Trademarks*